US010417940B2

(12) United States Patent
Probach et al.

(10) Patent No.: US 10,417,940 B2
(45) Date of Patent: Sep. 17, 2019

(54) PLATE HOLDER FOR HOLDING A LICENSE PLATE, IN PARTICULAR COMPRISING A RADIO FREQUENCY TRANSPONDER

(71) Applicant: Phoenix Contact GmbH & Co. KG, Blomberg (DE)

(72) Inventors: Nicole Probach, Blomberg (DE); Patrick Oster, Lemgo (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 15/555,528

(22) PCT Filed: Feb. 19, 2016

(86) PCT No.: PCT/EP2016/053518
§ 371 (c)(1),
(2) Date: Sep. 4, 2017

(87) PCT Pub. No.: WO2016/142148
PCT Pub. Date: Sep. 15, 2016

(65) Prior Publication Data

US 2018/0047312 A1 Feb. 15, 2018

(30) Foreign Application Priority Data

Mar. 6, 2015 (DE) ........................ 10 2015 103 294

(51) Int. Cl.
*B60R 13/10* (2006.01)
*G09F 21/04* (2006.01)
(Continued)

(52) U.S. Cl.
CPC .................. *G09F 7/18* (2013.01); *G09F 7/10* (2013.01); *G09F 2007/1843* (2013.01); *G09F 2007/1895* (2013.01)

(58) Field of Classification Search
CPC .................. G09F 7/18; G09F 15/0012; G09F 2008/1843; G09F 1/10; G09F 1/12
See application file for complete search history.

(56) References Cited

U.S. PATENT DOCUMENTS 886,843 A * 5/1908 McLellan ............... G09F 23/00
229/125.12
3,889,408 A * 6/1975 Offner ........................ G09F 3/20
40/661.03
(Continued)

FOREIGN PATENT DOCUMENTS

DE 2950763 A1 6/1981
DE 3503686 A1 8/1986
(Continued)

*Primary Examiner* — Shin H Kim
(74) *Attorney, Agent, or Firm* — Leydig, Voit & Mayer, Ltd.

(57) ABSTRACT

A plate holder for holding a license plate includes: a holder base having, on a first side, a contact surface, which extends along a contact plane and on which a license plate is rests in a position arranged on the plate holder; and two guide rails, which are arranged on the holder base and extend parallel to each other and between which the license plate can be slid in an insertion direction for arrangement on the contact surface, the license plate being held between the guide rails in the position arranged on the plate holder, wherein the holder base has, on a second side facing away from the contact surface, a placement surface, which extends parallel to the contact plane, is spaced apart from the contact surface in a vertical direction pointing perpendicularly to the contact plane, and can be placed on an object to arrange the plate holder.

15 Claims, 4 Drawing Sheets

(51) Int. Cl.
*G09F 7/18* (2006.01)
*G09F 7/10* (2006.01)

(56) References Cited

U.S. PATENT DOCUMENTS

| | | | | | |
|---|---|---|---|---|---|
| 4,229,891 | A * | 10/1980 | Keller | G09F 7/00 | 40/590 |
| 4,262,436 | A * | 4/1981 | Clement | G09F 3/20 | 40/490 |
| 4,356,646 | A * | 11/1982 | Johnson, Jr. | G09F 3/18 | 101/369 |
| 4,357,768 | A * | 11/1982 | De Dube | G09F 3/20 | 40/653 |
| 4,376,348 | A * | 3/1983 | Ackeret | A47G 1/143 | 40/513 |
| 4,917,426 | A * | 4/1990 | Copp | B60R 13/105 | 293/142 |
| 4,958,452 | A * | 9/1990 | Tate | A01K 11/001 | 119/655 |
| 4,970,809 | A * | 11/1990 | Bushbaum | B60R 13/105 | 40/209 |
| 5,012,602 | A * | 5/1991 | Storey | B60R 13/105 | 40/201 |
| 5,052,081 | A * | 10/1991 | Fuehrer | A44C 3/001 | 224/667 |
| 5,419,134 | A * | 5/1995 | Gibson | G09F 1/10 | 248/223.41 |
| 5,592,767 | A * | 1/1997 | Treske | G09F 3/207 | 24/3.11 |
| 5,870,841 | A * | 2/1999 | Brody, II | B60R 13/105 | 40/200 |
| 6,050,014 | A * | 4/2000 | Ohlson | A45C 11/182 | 206/37 |
| 6,253,476 | B1 * | 7/2001 | Powell | B60R 13/105 | 280/507 |
| 6,427,836 | B1 * | 8/2002 | Bolanos | A45C 11/182 | 150/148 |
| 6,564,488 | B2 * | 5/2003 | Wittenberg | G09F 7/18 | 40/590 |
| 6,948,272 | B1 * | 9/2005 | Olivier | G09F 7/18 | 40/331 |
| 7,228,651 | B1 * | 6/2007 | Saari | A45F 5/004 | 224/162 |
| 7,308,771 | B2 * | 12/2007 | Memelink | G09F 3/20 | 150/147 |
| 7,556,297 | B2 * | 7/2009 | Ohno | B60R 19/18 | 293/120 |
| 7,857,022 | B2 * | 12/2010 | Kraml | A45C 11/182 | 150/147 |
| 7,877,909 | B1 * | 2/2011 | Hagen | A01K 11/00 | 40/300 |
| 8,047,363 | B2 * | 11/2011 | Sheba | A45C 11/18 | 206/307 |
| 8,225,538 | B2 * | 7/2012 | Warren | A47G 25/1435 | 223/85 |
| 9,003,682 | B2 * | 4/2015 | Garfinkle | G09F 7/10 | 40/606.01 |
| D802,506 | S * | 11/2017 | Bargen | D12/193 | |
| 2006/0162196 | A1 * | 7/2006 | Kaiser | B60R 13/10 | 40/208 |
| 2007/0180747 | A1 * | 8/2007 | Anzalone | G09F 7/18 | 40/765 |
| 2011/0079181 | A1 * | 4/2011 | Craig | A01K 1/0017 | 119/416 |
| 2011/0084126 | A1 * | 4/2011 | Fleming | G09F 3/0297 | 235/375 |
| 2013/0318843 | A1 * | 12/2013 | Nimtz | G09F 13/00 | 40/559 |
| 2015/0135568 | A1 * | 5/2015 | Knapschaefer | G09F 7/18 | 40/209 |
| 2018/0047312 | A1 * | 2/2018 | Probach | G09F 7/10 | |
| 2018/0075784 | A1 * | 3/2018 | Probach | G09F 3/20 | |

FOREIGN PATENT DOCUMENTS

| | | | |
|---|---|---|---|
| DE | 19743405 | A1 | 4/1999 |
| DE | 202011000569 | U1 | 6/2011 |
| EP | 0722158 | A1 | 7/1996 |
| EP | 3266017 | A1 | 1/2018 |
| GB | 2270408 | A | 3/1994 |
| GB | 2487927 | A | 8/2012 |
| JP | S 6084979 | U | 6/1985 |
| JP | 2006001509 | A | 1/2006 |
| JP | 2007526165 | A | 9/2007 |
| KR | 200456003 | Y1 | 10/2011 |
| WO | WO 8302516 | A1 | 7/1983 |
| WO | WO 9838621 | A1 | 9/1998 |
| WO | WO 2005082671 | A2 | 9/2005 |
| WO | WO 2016142148 | A1 | 9/2016 |

* cited by examiner

PLATE HOLDER FOR HOLDING A LICENSE PLATE, IN PARTICULAR COMPRISING A RADIO FREQUENCY TRANSPONDER

CROSS-REFERENCE TO PRIOR APPLICATIONS

This application is a U.S. National Phase application under 35 U.S.C. § 371 of International Application No. PCT/EP2016/053518, filed on Feb. 19, 2016, and claims benefit to German Patent Application No. DE 10 2015 103 294.5, filed on Mar. 6, 2015. The International Application was published in German on Sep. 15, 2016 as WO 2016/142148 under PCT Article 21(2).

FIELD

The invention relates to a plate holder for holding a license plate.

BACKGROUND

A plate holder of this type comprises a holder base having, on a first side, a contact surface, which extends along a contact plane. A license plate rests on the contact surface when it is placed on the plate holder. Arranged on the holder base are two guide rails extending parallel to each other, between which the license plate can be slid in an insertion direction for arrangement on the contact surface. In a position arranged on the plate holder, the guide rails hold the license plate on the holder base.

License plates may nowadays have, for example, radio frequency transponders (also called "RFID tags"), which can be read out by a suitable reader by inductive coupling and are configured to exchange data with the reader (using, for example, so-called "Near Field Communication", for short "NFC"). If a license plate is to be arranged via a plate holder on a metal object, for example a metal housing of an industrial plant, a switch cabinet or the like, the metal object may impair the communication properties of a radio frequency transponder of this type if the radio frequency transponder comes to rest too close to the metal object.

It is therefore necessary, in a plate holder of this type, which is to be used for attachment of a license plate having a radio frequency transponder on a metal object, to leave sufficient space between the contact surface and the metal object in order to reduce as far as possible an impairment of the communication properties of the radio frequency transponder.

However, if a plate holder is too far from the object to which it has been attached, this can lead, for example, to the clothes of a user getting caught on the plate holder or a user bumping against the plate holder, which may possibly entail a risk of injury and is therefore to be avoided for the purposes of a safe working environment.

A plate holder for a license plate is known from DE 197 43 405 A1, in which a plate can be arranged between guide rails on a contact surface. The plate holder of DE 197 43 405 A1 is designed to arrange a license plate on a line.

In a plate holder known from DE 20 2011 000 569 U1, a license plate is arranged on a base body 2 by means of rivet connections. A radio frequency transponder, which can be read out electronically, is arranged on the license plate.

SUMMARY

In an embodiment, the present invention provides a plate holder for holding a license plate, comprising: a holder base having, on a first side, a contact surface, which extends along a contact plane and on which a license plate is configured to rest in a position arranged on the plate holder; and two guide rails, which are arranged on the holder base and extend parallel to each other and between which the license plate is configured to be slid in an insertion direction for arrangement on the contact surface, the license plate being configured to be held between the guide rails in the position arranged on the plate holder, wherein the holder base has, on a second side facing away from the contact surface, a placement surface, which extends parallel to the contact plane, is spaced apart from the contact surface in a vertical direction pointing perpendicularly to the contact plane, and is configured to be placed on an object in order to arrange the plate holder on the object, the holder base tapering from the second side to the first side.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 7A is a view of the plate holder according to FIG. 1, with cross-sectional planes drawn in;

DETAILED DESCRIPTION

Figure 1:
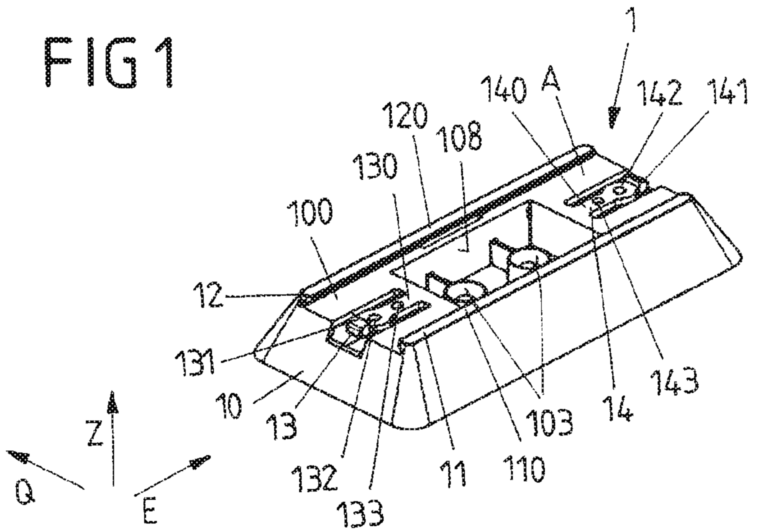
FIG. 1 is a perspective view of an embodiment of a plate holder.
Figure 2:
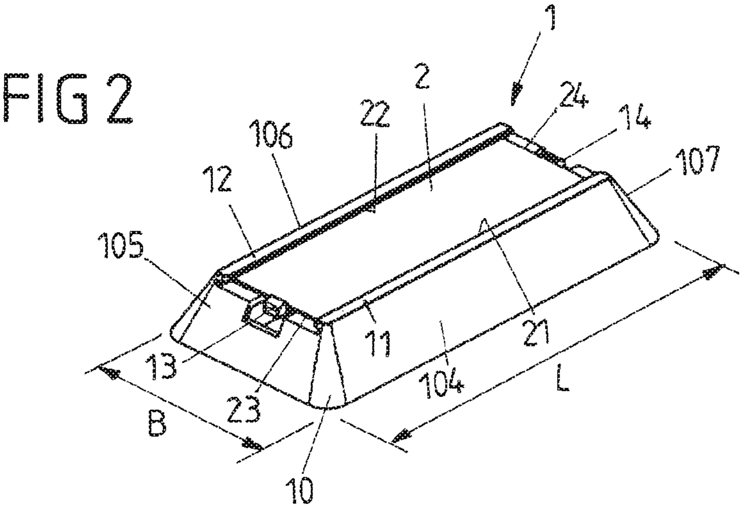
FIG. 2 is a perspective view of the plate holder, with a license plate arranged thereon.
Figure 3:
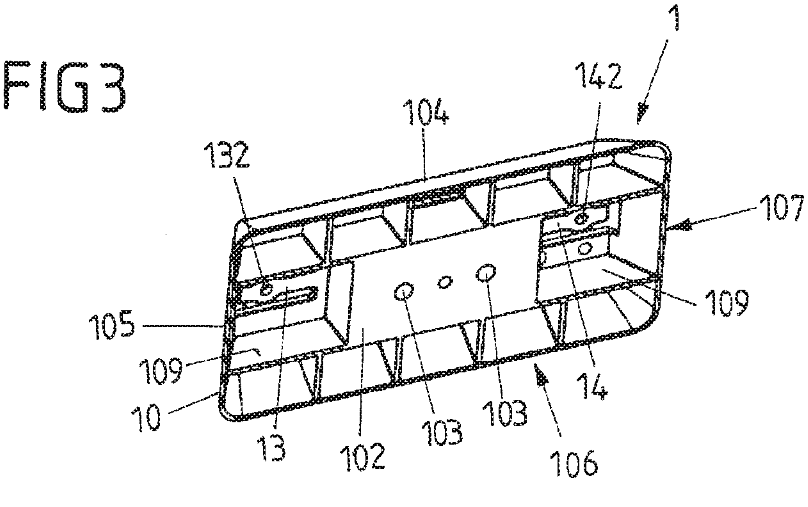
FIG. 3 is a perspective view of the plate holder from below.
Figure 4A:
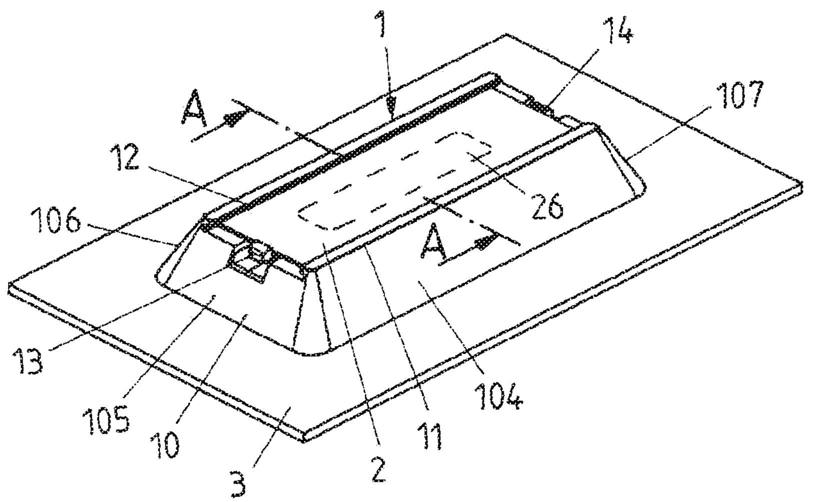
FIG. 4A is a view of the plate holder on an object.
Figure 4B:
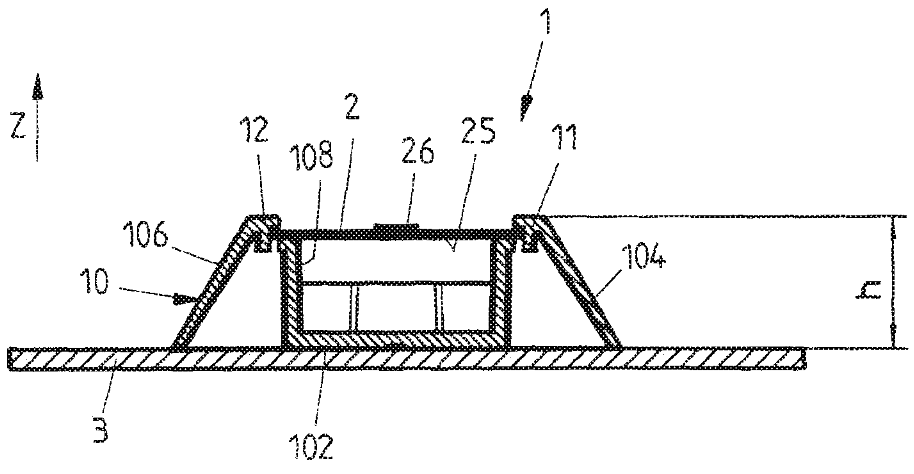
FIG. 4B is a sectional view along the line A-A according to FIG. 4A.

According to an embodiment, the holder base, on a second side facing away from the contact surface, has a placement surface, which extends parallel to the contact plane, is spaced apart from the contact surface in a vertical direction pointing perpendicularly to the contact plane, and can be placed on an object in order to arrange the plate holder on the object, the holder base tapering from the second side to the first side.

The possibility is provided by means of the placement surface to favorably place the plate holder in flat abutment on an associated object. By means of the placement surface, the holder base can, for example, be screwed or glued to the object or otherwise fastened to the object.

The placement surface is spaced apart from the contact surface such that a license plate can be held on the contact surface so as to leave sufficient space from the placement surface and therefore from the object on which the plate holder is to be arranged.

The holder base has a shape, here, which tapers from the second side to the first side. The holder base therefore extends from the second side, on which the placement surface is formed, to the first side, on which the contact surface is formed, in a tapering manner, as a result of which the risk of, for example, clothes getting caught on the plate holder is reduced.

In particular, the holder base, on the second side, may have a greater length, measured in the insertion direction, and/or a greater width, measured transversely to the insertion direction, than on the first side. The dimensions of the holder base on the first side are therefore smaller than on the second side.

The holder base preferably has one or more peripheral side surfaces. The side surfaces connect the first side and the second side to each other and are hereby advantageously placed obliquely with respect to the contact plane in such a way that the holder base tapers toward the first side, in other words toward the contact surface.

For example, the holder base may have the shape of a truncated cone. In this case, the holder base has a peripheral side surface, which corresponds to the outer lateral surface of the truncated cone. In this case, the holder base extends conically toward the first side.

Alternatively, the holder base may also have a rectangular, for example elongate or square, base surface. In this case, the holder base has four side surfaces, which are in each case placed obliquely to the contact plane and form a truncated pyramid.

The one or more side surfaces peripherally enclose the holder base and advantageously have no openings, undercuts, projections or the like, such that the snagging of clothes or other objects on the plate holder is prevented and, for example, clothes can easily slip off the plate holder.

In a specific embodiment, the holder base, on the first side thereof, may have an at least approximately rectangular base surface. In this case, the holder base, in cross section along a first cross-sectional plane, which is spanned by the insertion direction and the vertical direction, and/or along a second cross-sectional plane, which is spanned by the vertical direction and a transverse direction pointing transversely to the insertion direction and to the vertical direction, may have the shape of an isosceles trapezium. In cross section along the first cross-sectional plane and/or in cross section along the second cross-sectional plane, the holder base therefore has a trapezoidal shape with sides of equal length, the sides being formed by opposing side surfaces of the holder base and the (parallel) base sides of the trapezium being formed by the first side and the second side of the holder base.

In an advantageous embodiment, the placement surface has at least one fastening point for fastening the plate holder on the object. The fastening point may, for example, be designed to attach a screw or rivet connection such that, by means of the placement surface, the plate holder can be fastened to the object by screws or rivets.

In order to be able to access the fastening points, at least one opening may be provided here in the contact surface, which extends along the contact plane extending parallel to the placement surface, by means of which opening a tool, for example, can be placed on the fastening point of the placement surface in order to fasten the plate holder on the object.

In addition or alternatively, the placement surface may also have an adhesive layer comprising a removable protective film. The protective film covers the adhesive layer in an initial state such that the plate holder may, for example, be delivered to a user of the plate holder with the adhesive layer covered. The protective film is removed in order to fasten the plate holder to an object, such that the placement surface together with the adhesive layer can be pressed against the object in order to bring the adhesive layer into adhesive contact with the object.

In an advantageous embodiment, the plate holder has at least one resilient latching element, which is arranged on the holder base and is elastically deformable when the license plate is arranged on the plate holder and, in the position arranged on the plate holder, fixes the license plate on the holder base against a movement in the insertion direction. By providing the resilient latching element, it is possible to easily place a license plate, which is optionally rigid per se, on the plate holder and also to release the license plate from the plate holder without tools. In order to place a license plate on the plate holder, the license plate is slid between the guide rails. The license plate hereby runs onto the at least one latching element and pushes it aside in a resilient manner such that the license plate can be inserted into the plate holder over the latching element. Once the license plate has reached its provided seat on the holder base, the latching element snaps back into its starting position and comes into latching engagement, for example with an edge of the license plate, such that the license plate is fixed on the holder base by means of the latching element against a movement in the insertion direction.

A license plate can therefore be easily placed on the plate holder by pushing aside the latching element without the license plate having to be deformed. Since, when the license plate has reached its provided position on the plate holder, the latching element snaps into latching engagement with the license plate and therefore permanently fixes it on the plate holder, a reliable hold of the license plate on the plate holder is provided.

In order to release the license plate from the plate holder, the at least one latching element may be deformed in such a way that the license plate is released for displacement in the insertion direction and can therefore be slid out of the plate holder. The elastic deformation of the latching element can take place without tools in that a user, for example, manually grasps the latching element and presses it out of engagement with the license plate. Deformation of the license plate is therefore not necessary for release from the plate holder, and therefore even rigid license plates, which cannot readily be deformed, can be easily arranged on the plate holder and can also be easily released again from the plate holder.

In an advantageous embodiment, the plate holder has two latching elements, which are arranged on the holder base so as to be offset from each other in the insertion direction. In the position arranged on the plate holder, the latching elements receive the license plate between them, for example, in that a first latching element comes to rest on a first edge of the license place extending transversely to the guide rails and a second latching element comes to rest on a second edge of the license plate extending transversely to the guide rails, and therefore the license plate is fixed in an interlocking manner on the holder base in the insertion direction.

The at least one latching element, in a specific embodiment, is formed by a resilient web, which is connected to the contact surface. The web may, for example, be cut out from the contact surface via slot-shaped openings, such that a latching element in the manner of a latching tongue is produced, which can be moved in a resilient manner with respect to the contact surface. A latching projection, which rises above the contact surface and therefore provides a stop for the license plate, is preferably arranged on the at least one latching element. When placing the license plate on the plate holder, the license plate runs onto the latching projection of the latching element and therefore pushes the latching element aside. If the license plate has reached its provided position on the plate holder, the latching projection snaps into engagement, for example with an edge of the license plate, such that the edge comes into abutment with the latching projection and the license plate is thus fixed on the plate holder against a displacement in the insertion direction.

By means of the latching projection, the license plate is fixed on the plate holder in a latching manner such that the license plate is prevented from sliding out of its seat between the guide rails. In addition, the at least one latching element may have an elevation projecting from the contact surface, which is designed to come into abutment with a lower side of the license plate facing the contact surface in the position of the license plate arranged on the plate holder. The elevation may, for example, be rounded in a lenticular manner such that the license plate can easily run onto the elevation upon insertion into the plate holder. Once the license plate has been placed on the plate holder, the elevation presses from below against the license plate and therefore presses it into abutment with the guide rails perpendicularly to the contact surface such that the license plate is held on the guide rails without clearance and rattling.

In addition, a fastening point for fastening the license plate on the holder base may be arranged on the at least one latching element. The fastening point may, for example, be designed to attach a rivet or screw connection, such that the license plate, when it has been placed on the plate holder, can additionally be fastened on the plate holder by means of the fastening point over and above the latching connection provided by the at least one latching element.

In order to access the latching element on the contact surface, in an advantageous embodiment, at least one opening may be provided on the placement surface, by means of which opening the latching element, in particular the fastening point provided on the latching element, can be accessed.

A license plate, which comprises a radio frequency transponder, may advantageously be arranged on the plate holder. Since the distance between the contact surface and the placement surface is suitably selected, the license plate can be arranged at a sufficient distance from, for example, a metal object, such that the communication properties of the radio frequency transponder of the license plate are not (excessively) impaired by the metal object. Depending on the type and design of the license plate, different plate holders, which in each case provide a suitable distance between the contact surface and placement surface, may be used here.

FIGS. 1 to 4A, 4B show a first embodiment of a plate holder 1, which is used to hold a license plate 2 and to fasten the license plate 2 on an object 3. The plate holder 1 is, in particular, designed for fastening on a planar surface of an object 3, for example a metal housing of a plant, for example a switch cabinet or the like.

The plate holder 1 has a holder base 10, which forms a contact surface 100 on a first side. A license plate 2 can be arranged on the contact surface 100 in that the license plate 2 is slid in an insertion direction E between guide rails 11, 12 arranged laterally on the contact surface 100.

The contact surface 100 extends in a contact plane A, which is spanned by the insertion direction E and a transverse direction Q. In a vertical direction Z transverse to the insertion direction E and transverse to the transverse direction Q, spaced apart from the contact surface 100, a placement surface 102 is formed on a second side of the holder base 10, by means of which the holder base 10 can be placed on the object 3 in a planar manner.

Fastening points 103, by means of which the holder base 10 can, for example, be screwed or riveted to the object, are provided on the placement surface 102.

Alternatively, the holder base 10 can be fastened to the object 3 by gluing the placement surface 102 to the object 3.

The plate holder 1 has a tapering shape from the second side, on which the placement surface 102 is formed, to the first side, on which the contact surface 100 is formed. The holder base 10 has a substantially rectangular base surface on the second side, the dimensions of which, in particular the length L measured in the insertion direction E and the width B measured in the transverse direction Q, are greater than the dimensions on the first side of the holder base 10.

The holder base 10 is closed on the outer peripheral surface thereof extending between the first side and the second side by means of side surfaces 104 to 107. The side surfaces in each case extend obliquely to the vertical direction Z, in that they, for example, define an angle between 20° and 70°, for example between 30° and 60° to the vertical direction Z.

Figure 7A:
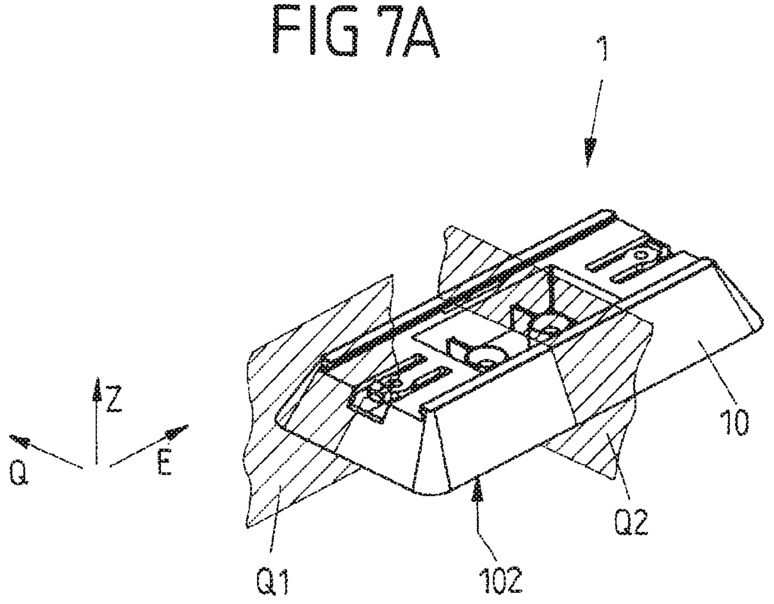
Figure 7B:
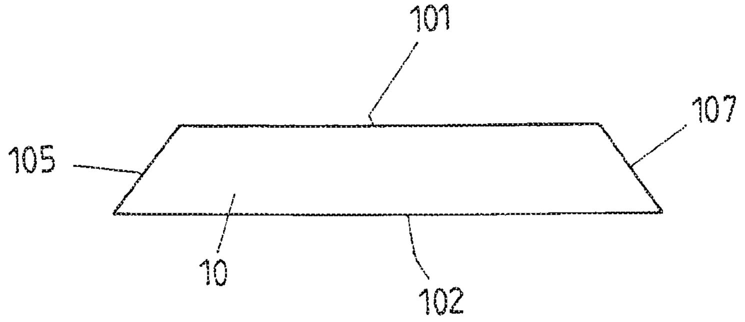
FIG. 7B is a schematic cross-sectional view along a first cross-sectional plane Q1 according to FIG. 7A.
Figure 7C:
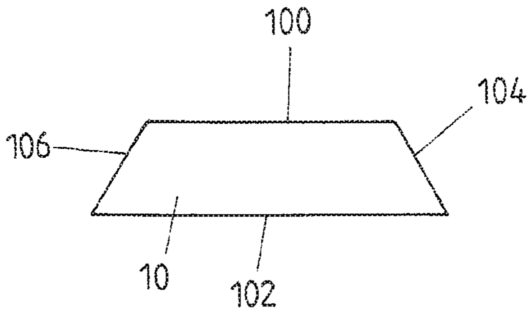
FIG. 7C is a schematic cross-sectional view along a second cross-sectional plane Q2 according to FIG. 7A.

Because of the obliquely placed side surfaces 104 to 107, the holder base 10 has a trapezoidal shape in cross section, as illustrated in FIG. 7A to 7C. Thus, the holder base 10 is trapezoidal both in a first cross-sectional plane Q1 spanned by the insertion direction E and the vertical direction Z and in a second cross-sectional plane Q2 spanned by the vertical direction Z and the transverse direction Q. The holder base 10 forms an isosceles trapezium, in which the contact surface 100 and the placement surface 102 are the base sides running parallel to each other and the opposing side surfaces 104, 106 and 105, 107, respectively, are sides of equal length of the trapezium.

Because the contact surface 100 is spaced apart from the placement surface 102 in the vertical direction Z in a manner corresponding to the height h of the holder base 10 (see FIG. 4B), a license plate 2, which has a radio frequency transponder 26, can be advantageously arranged on the plate holder 1. Because the license plate 2 is held so as to leave a space from the, for example, metal object 3, communication properties of the radio frequency transponder are not impaired by the proximity to the metal object 3, and therefore, by means of a suitable reader, for example, data can be read out from the radio frequency transponder, for example a so-called RFID tag.

Because, in addition, the holder base 10 of the plate holder 1 has a shape tapering toward the contact surface 100, the risk of a person bumping into the plate holder 1 or catching their clothes on the plate holder 1 is small. This is achieved, on the one hand, by the tapering shape of the holder base 10 and, on the other hand, by the outer peripheral surface closed by means of the side surfaces 104 to 107.

The guide rails 11, 12 in each case have, on an edge remote from the contact surface 100, a guide strip 110, 120, which defines an interlocking engagement for a license plate 2. A license plate 2 can be inserted between the guide rails 11, 12 in an insertion direction E such that, in a position in which the license plate 2 is arranged on the plate holder 1, the license plate 2 comes to rest between the guide rails 11, 12 and is held on the plate holder 1 perpendicularly to the contact surface 100 by means of the guide strips 110, 120 (see FIG. 2).

Two latching elements 13, 14, which are cut free from the contact surface 100 via slot-shaped openings 101 in the manner of latching tongues, are arranged on the contact surface 100. The latching elements 13, 14 are in each case connected by a web 130, 140 to the contact surface 100 and extend in the manner of tongues in the insertion direction E. By means of the webs 130, 140 thereof, the latching elements 13, 14 are resilient perpendicularly to the contact surface 100.

Each latching element 13, 14 has a latching projection 131, 141. The latching projections 131, 141 receive the license plate 2 between them in the position arranged on the plate holder 1 in such a way that the license plate 2 is fixed on the plate holder 1 against a movement in the insertion direction E (see FIG. 2). Each latching projection 131, 141 comes into abutment with an edge 23, 24 of the license plate 2 extending transversely to the guide rails 11, 12 such that the license plate 2 is held thereby in an interlocking manner between the latching projections 131, 141.

In addition to the latching projection 131, 141, a fastening point 132, 142, which allows the attachment of a rivet connection, is in each case arranged on the latching elements 13, 14. An additional fixing of the license plate 2 on the holder base 10 can take place by means of a rivet connection of this type.

In addition, as drawn in schematically in FIG. 1, an elevation 133, 143, which projects from the contact plane A created by the contact surface 100, is arranged on each latching element 13, 14. Once the license plate 2 has been placed on the plate holder 1, the elevations 133, 143 of the latching elements 13, 14 rest from below on the lower side 25 (see FIG. 4B) of the license plate 2 such that the license plate 2 is pressed perpendicularly from below by means of the elevations 133, 143 against the guide strips 110, 120 of the guide rails 11, 12 and a prestressing on the license plate 2 is thus exerted, which fixes the license plate 2 on the plate holder 1 without clearance and rattling.

For placing, the license plate 2 is placed on the plate holder 1 and slid from one side between the guide rails 11, 12 by means of its lateral edges 21, 22 in the insertion direction E. The front transverse edge 24 of the license plate 2 thus comes into abutment with the latching projection 31 of the latching element 13 on the side of the plate holder 1 by means of which the license plate 2 is inserted into the plate holder 1. The license plate 2 thus runs onto the latching projection 131 and pushes the latching element 13 aside such that the license plate 2 can be pushed over the latching projection 131 between the guide rails 11, 12.

Once the license plate 2 has been completely inserted into the plate holder 1, the latching projection 131 of the latching element 13 comes into abutment with the rear transverse edge 23 in a latching manner, such that the transverse edges 23, 24 of the license plate 2 are received between the latching projections 131, 141 of the latching elements 13, 14 and additionally the lateral edges 21, 22 of the license plate are held between the lateral guide rails 11, 12.

In order to release the license plate 2 from the plate holder 1, one of the latching elements 13, 14 can be resiliently bent out of engagement with the associated transverse edge 23, 24 of the license plate 2 such that the license plate 2 can be slid out of engagement with the guide rails 11, 12 over the corresponding latching element 13, 14. This is possible without using a tool and, in particular, without deformation of the license plate 2.

An opening 108, by means of which access can be gained to the fastening point 103 on the placement surface 102, is provided on the contact surface 100. Screw connections, for example, can therefore be placed at the fastening points 103 from the side of the contact surface 100 in order to connect the plate holder 1 to the object 3.

Openings 109, which are associated with the latching elements 13, 14, are also provided on the second side of the holder base 10. Access to the latching elements 13, 14, and, in particular, the fastening points 132, 142 arranged thereon, can be gained by means of the openings 109 from the side of the placement surface 102.

Figure 5:
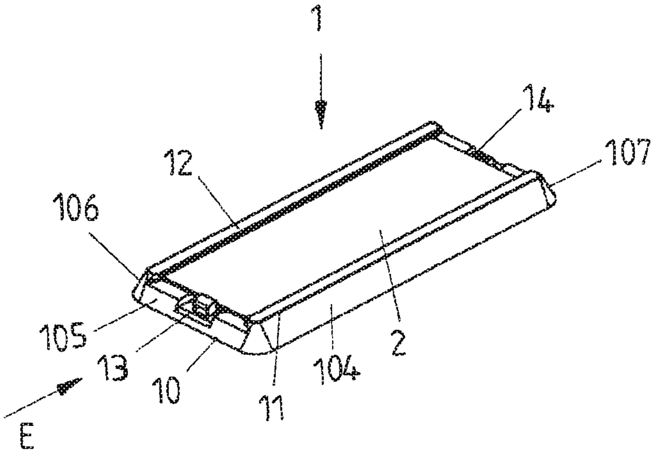
FIG. 5 is a view of a second embodiment of a plate holder, with a license plate arranged thereon.
Figure 6:
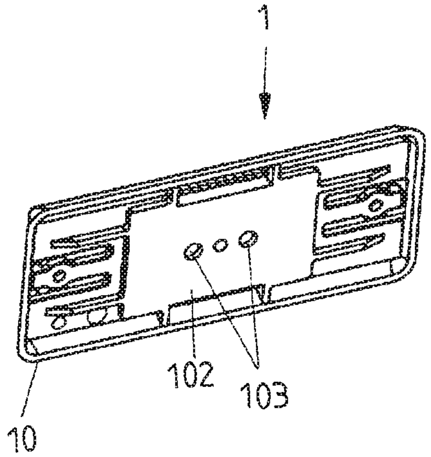
FIG. 6 is a perspective view of the plate holder according to FIG. 5, obliquely from below.

A second embodiment of a plate holder 1 is shown in FIGS. 5 and 6. The plate holder 1 according to FIGS. 5 and 6 substantially has the same function as the embodiment according to FIGS. 1 to 4A, 4B, but has a smaller height and therefore a smaller distance between the contact surface 100 and placement surface 102.

The holder base 10 in the embodiments described above is advantageously produced as a molded plastics material part, for example by means of plastics material injection molding.

The concept on which the invention is based is not limited to the embodiments described above, but can in principle also be realized in a completely different way.

For example, the base surface of the holder base may also be circular, such that the holder base is designed in the manner of a truncated cone and tapers conically to the contact surface.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 plate holder
10 holder base
100 contact surface
101 slots
102 placement surface
103 fastening points
104 to 107 side surface
108 opening

109 opening
11, 12 guide rail
110, 120 guide strip
13, 14 latching element
130, 140 web
131, 141 latching nose
132, 142 fastening point
133, 143 elevation
2 license plate
21 to 24 edge
25 lower side
26 transponder
3 object
A contact plane
B width
E insertion direction
h height
L length
Q transverse direction
Q1, Q2 cross-sectional plane
Z vertical direction

The invention claimed is:

1. A plate holder for holding a license plate, comprising:

a holder base having, on a first side, a contact surface, which extends along a contact plane and on which a license plate is configured to rest in a position arranged on the plate holder; and two guide rails, which are arranged on the holder base and extend parallel to each other and between which the license plate is configured to be slid in an insertion direction for arrangement on the contact surface, the license plate being configured to be held between the guide rails in the position arranged on the plate holder, wherein the holder base has, on a second side facing away from the contact surface, a placement surface, which extends parallel to the contact plane, is spaced apart from the contact surface in a vertical direction pointing perpendicularly to the contact plane, and is configured to be placed on an object in order to arrange the plate holder on the object, the holder base tapering from the second side to the first side.

2. The plate holder according to claim 1, wherein the holder base, on the second side, has a greater length, measured in the insertion direction, and/or a greater width, measured transversely to the insertion direction, than on the first side.

3. The plate holder according to claim 1, wherein the holder base has at least one side surface, which connects the first side and the second side to each other and is placed obliquely to the contact plane.

4. The plate holder according to claim 1, wherein the holder base, in cross section along a first cross-sectional plane, which is spanned by the insertion direction and the vertical direction, and/or along a second cross-sectional plane, which is spanned by the vertical direction and a transverse direction pointing transversely to the insertion direction and to the vertical direction, has the shape of an isosceles trapezium.

5. The plate holder according to claim 1, wherein the placement surface has at least one fastening point configured to fasten the plate holder on the object, the contact surface having at least one opening, by which the at least one fastening point on the placement surface is configured to be accessed.

6. An assembly comprising a plate holder according to claim 1 and a license plate, on which a radio frequency transponder is arranged.

7. A plate holder for holding a license plate, comprising:

a holder base having, on a first side, a contact surface, which extends along a contact plane and on which a license plate is configured to rest in a position arranged on the plate holder;

two guide rails, which are arranged on the holder base and extend parallel to each other and between which the license plate is configured to be slid in an insertion direction for arrangement on the contact surface, the license plate being configured to be held between the guide rails in the position arranged on the plate holder; and at least one resilient latching element, which is arranged on the holder base and is elastically deformable when the license plate is arranged on the plate holder and, in the position arranged on the plate holder, is configured to fix the license plate on the holder base against a movement in the insertion direction, wherein the holder base has, on a second side facing away from the contact surface, a placement surface, which extends parallel to the contact plane, is spaced apart from the contact surface in a vertical direction pointing perpendicularly to the contact plane, and is configured to be placed on an object in order to arrange the plate holder on the object, the holder base tapering from the second side to the first side.

8. The plate holder according to claim 7, wherein the at least one resilient latching element comprises two latching elements, which are arranged on the holder base so as to be offset from one another in the insertion direction.

9. The plate holder according to claim 8, wherein the two latching elements are configured to receive the license plate between them in the position arranged on the plate holder.

10. The plate holder according to claim 7, wherein the at least one latching element is connected by a web to the contact surface of the holder base.

11. The plate holder according to claim 7, wherein the at least one latching element has a latching projection, which projects from the contact surface transversely to the contact plane and is configured, in the position of the license plate arranged on the plate holder, to come into abutment with an edge of the license plate.

12. The plate holder according to claim 7, wherein the at least one latching element has an elevation, which projects from the contact surface and is configured, in the position of the license plate arranged on the plate holder, to come into abutment with a lower side of the license plate facing the contact surface.

13. The plate holder according to claim 7, wherein the at least one latching element has a fastening point configured to fasten the license plate on the holder base.

14. The plate holder according to claim 7, wherein the placement surface has at least one opening, by which the at least one latching element on the contact surface is configured to be accessed.

15. A plate holder for holding a license plate, comprising:

a holder base having, on a first side, a contact surface, which extends along a contact plane and on which a license plate is configured to rest in a position arranged on the plate holder; and two guide rails, which are arranged on the holder base and extend parallel to each other and between which the license plate is configured to be slid in an insertion direction for arrangement on the contact surface, the license plate being configured to be held between the guide rails in the position arranged on the plate holder, wherein the holder base has, on a second side facing away from the contact surface, a placement surface, which extends parallel to the contact plane, is spaced apart from the contact surface in a vertical direction pointing perpendicularly to the contact plane, and is configured to be placed on an object in order to arrange the plate holder on the object, the holder base tapering from the second side to the first side, and wherein the placement surface has an adhesive layer comprising a removable protective film, the protective film, in order to fasten the plate holder on the object, being configured to be removable in order to bring the adhesive layer into adhesive contact with the object.

* * * * *